UNITED STATES PATENT OFFICE.

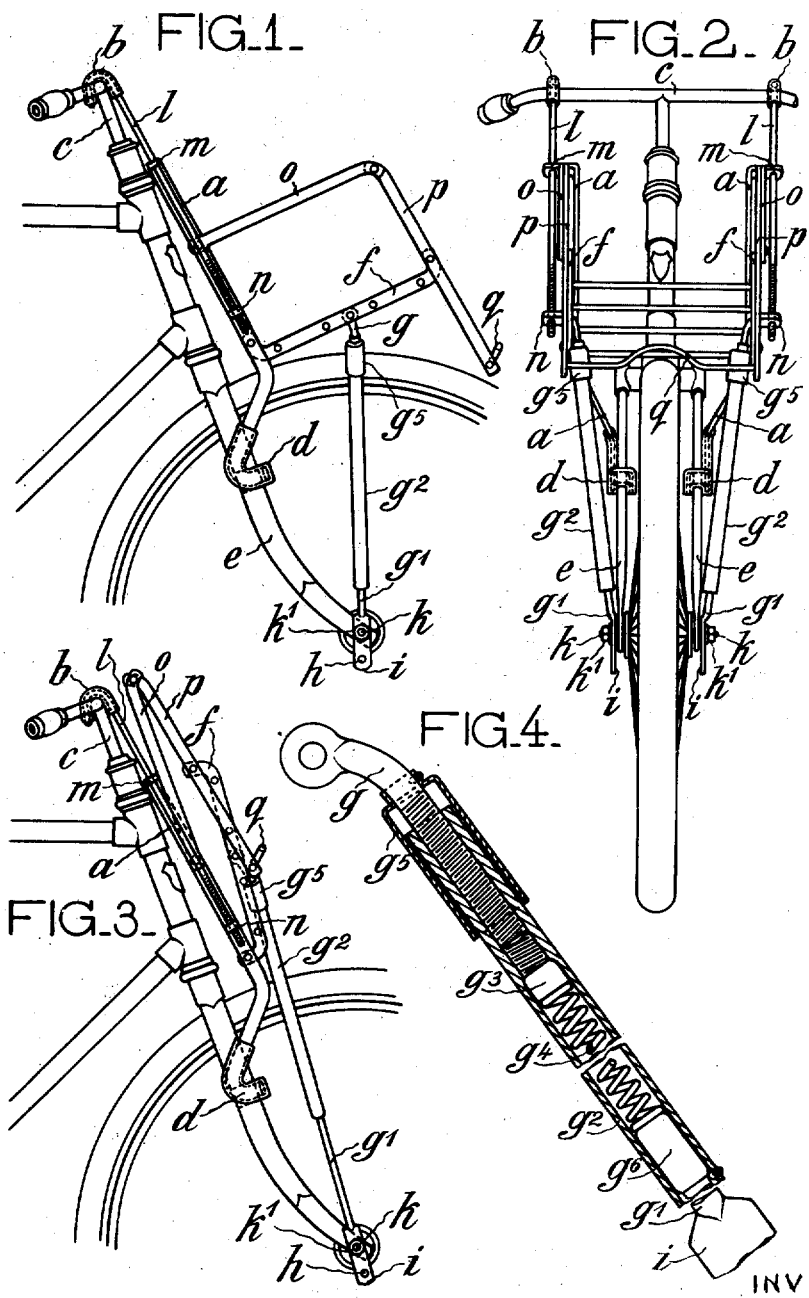

JOSEPH JAHNEL, OF DITTERSBACH, AND BRUNO GROHMANN, OF OSTRITZ, GERMANY.

CARRYING ATTACHMENT FOR BICYCLES.

No. 903,290.  Specification of Letters Patent.  Patented Nov. 10, 1908.

Application filed December 31, 1907. Serial No. 408,723.

*To all whom it may concern:*

Be it known that we, JOSEPH JAHNEL, a subject of the King of Prussia, residing at Dittersbach, a. d. Eigen, in the Kingdom of Saxony, Empire of Germany, and BRUNO GROHMANN, a subject of the King of Saxony, residing at Ostritz, in the Kingdom of Saxony, Empire of Germany, have invented new and useful Improvements in Carrying Attachments for Bicycles, of which the following is a specification.

Carrying attachments for bicycles are known, which are suspended by hooks over the handle bars and which rest, by hooks, upon the legs of the front wheel. This kind of carrying attachment, while it can be attached with extraordinary ease and handily on the wheel, and can be easily removed therefrom, will not stand heavy loads, because the distribution of the load to the front part of the bicycle frame is extremely unfavorable. To increase the carrying capacity of such carrying attachment, downwardly-directed supports have been provided for bearing the load, and having their lower ends fastened by clamps, clips or bushings to the lower fore end of the front wheel. However, this overloaded the front wheel, already, at its weakest part, under heavy stress from shocks; such overloading is dangerous, especially on account of the unavoidable violent shocks from the heavy charge of the carrying attachment. It has been attempted to prop the carrying arrangement against the axle proper, by means of supports secured, at the lower ends, with the front wheel axle, and to thereby relieve the front part of the bicycle frame.

In all carrying attachments for bicycles hitherto so constructed, the carrying load is fastened by means of one or more bushings, clamps or clips on the handle bar or some other part of the front bicycle frame. This consumes much time for the attachment and removal of the carrying attachment.

In the present invention, the advantage of all above-named kind of carrying attachments for bicycles are combined without having any of the drawbacks thereof, inasmuch as the carrying attachments are provided with supports in the usual manner by hooks passing over the handle bar and resting on the front wheel fork on the bearing place of the load.

By the combination forming the subject-matter of this invention, a carrying arrangement for bicycles is attained which distributes the load upon the handle-bar, the front-wheel fork and the front-wheel axle as much as possible, and thereby increasing the capacity without a high load. On the other hand, it can easily and handily be attached and removed, in a short time requiring only the detachment and re-fastening of the two nuts which are always provided on the front-wheel axle. Another material advantage is that no special fastening means is called for by the carrying attachment; these are often lost because they may not be secured after removing the carrying attachments.

Our invention relates to improvements in such carrying attachments for bicycles, which are provided with hooks for hanging on the handle-bar and bearing against the side parts of the fore-wheel fork, whereby the safety and the carrying power are considerably increased, while the position of the attachment with regard to the handle-bar and the fore-wheel axle can be adjusted at will.

One improvement consists in two extensible and elastic supporting rods, which are pivotally connected with the seat or support adapted to carry a person or a baggage and are made to rest on the two ends of the fore-wheel axle. Thereby most of the load is transferred direct to the fore-wheel axle, so that the handle-bar and the fork side parts are less strained than hitherto.

Another improvement consists in rendering extensible the two rear posts of the attachment, which are provided with the four hooks, so that the attachment may be adjusted to the varying height of the handle-bar above the fore-wheel axle.

A third improvement consists in making the carrying attachment foldable.

Other improvements will be fully described hereinafter and pointed out in the claim.

We will now proceed to describe our invention with reference to the accompanying drawing, in which—

Figure 1 is a side elevation of our improved carrying attachment and a part of a bicycle, Fig. 2 is a front view of the same, Fig. 3 is a side elevation of the same, when the carrying attachment is folded, and Fig. 4 is a longitudinal section through one extensible supporting rod, two intermediate parts and a lower part of same being broken away.

Similar letters of reference refer to similar parts throughout the several views.

The two rear posts provided with the upper hooks $b\ b$ for hanging on the handle-bar $c$ and with the lower hooks $d\ d$ for bearing against the side parts $e\ e$ of the fore-wheel fork are according to our invention made extensible, they consisting each of an upper part $l$ and a lower part $a$. The upper part $l$ is formed as a screw-spindle which passes through two ears $m$ and $n$ of the lower part $a$, it engaging the screw-thread in the ear $n$ and being guided in the ear $m$.

The two side parts of the seat or support $f$ are shown as pivotally connected with the lower parts $a\ a$ of the two extensible rear posts and with the two front posts $p\ p$. The upper ends of the latter are pivotally connected with the two parts $a\ a$ by means of links $o\ o$, while the lower ends may be connected together by a bent foot rest $q$. The seat or support $f$ is according to our invention elastically supported by two extensible rods, the upper ends of which are pivotally connected with the two side parts of the seat or support $f$, while their lower ends are adapted to rest on the two ends of the fore-wheel axle $k$. The construction of the two extensible elastic supporting rods may be for example as follows: Each supporting rod consists of an upper screw-threaded part $g$, a guiding tube $g^2$ internally screw-threaded at the upper end for engaging the screw-thread of the part $g$, and a lower part $g^1$, which latter is mostly cylindrical and terminates in a thickened cylindrical head $g^6$ above and in a flat piece $i$ below. A disk $g^3$ may be disposed within the tube $g^2$ and a helical spring $g^4$ is inserted between it and the head $g^6$, which is guided in the tube $g^2$. The flat piece $i$ may be provided with several holes $h$, through any of which the end of the fore-wheel axle $k$ can be introduced. The two flat pieces $i\ i$ may be secured on the fore-wheel axle $k$ by means of the ordinary nuts $k^1\ k^1$ or special nuts or the like. A protecting sleeve $g^5$ is preferably fastened on each upper part $g$ for inclosing the upper part of the tube $g^2$ and thus protecting its screw-thread from moisture, dust and dirt. It will be seen, that the distance between the fore-wheel axle $k$ and the hole in the head of the part $g$ can be varied and adjusted by inserting the end of the axle $k$ in the respective hole $h$ and by turning the tube $g^2$ in one or the other direction. Thereby the inclination of the seat or support $f$ can be adjusted. It is also obvious, that most of the load, be it the weight of a child sitting on the seat $f$ or that of a baggage or the like resting on the support $f$, will be transferred direct to the fore-wheel axle $k$, so that the handle-bar $c$ and the two side parts $e\ e$ of the fore-wheel fork are protected from excessive strains. The helical springs $g^4$ in the two supporting rods are adapted to take up the shocks and vibrations, which are therefore not transmitted to the child or baggage or the like.

When the seat or support $f$ is not loaded, it will be folded up by the two helical springs $g^4$, as is shown at Fig. 3, and if necessary the two tubes $g^2\ g^2$ may be turned in the respective direction for lengthening the two supporting rods.

The carrying attachment for bicycles described may be varied in many respects without departing from the spirit of our invention.

We claim:

In a carrying attachment for bicycles, the combination with two extensible posts provided with hooks at the ends for hanging on the handle-bar and bearing against the two side parts of the fore-wheel fork respectively and each consisting of a hooked screw-spindle and a hooked part which is provided with ears for fitting the screw-spindle, of a carrying means pivotally connected with said two extensible posts, and two extensible supporting rods pivotally connected with said carrying means and adapted to rest on the two ends of the fore-wheel axle.

In testimony whereof we have signed this specification in presence of two witnesses.

JOSEPH JAHNEL.
BRUNO GROHMANN.

Witnesses:
ERICH TANSCHER,
MARLIN WAGNER.